United States Patent
Drinkard, Jr.

(10) Patent No.: US 8,016,913 B2
(45) Date of Patent: Sep. 13, 2011

(54) NICKEL-LATERITE PROCESS

(75) Inventor: William F. Drinkard, Jr., Charlotte, NC (US)

(73) Assignee: Drinkard Metalox, Inc., Charlotte, NC (US)

( * ) Notice: Subject to any disclaimer, the term of this patent is extended or adjusted under 35 U.S.C. 154(b) by 0 days.

(21) Appl. No.: 12/451,229

(22) PCT Filed: May 1, 2008

(86) PCT No.: PCT/US2008/005608
§ 371 (c)(1), (2), (4) Date: Oct. 30, 2009

(87) PCT Pub. No.: WO2008/137025
PCT Pub. Date: Nov. 13, 2008

(65) Prior Publication Data
US 2010/0064854 A1 Mar. 18, 2010

Related U.S. Application Data

(60) Provisional application No. 60/927,195, filed on May 2, 2007.

(51) Int. Cl.
*C22B 3/06* (2006.01)

(52) U.S. Cl. .......................... 75/743; 423/162; 423/164
(58) Field of Classification Search ................. 75/743
See application file for complete search history.

(56) References Cited

U.S. PATENT DOCUMENTS

| | | | | |
|---|---|---|---|---|
| 3,193,381 | A | * | 7/1965 | Stone et al. .................. 423/139 |
| 3,772,422 | A | * | 11/1973 | Taylor ............................ 423/56 |
| 3,986,866 | A | * | 10/1976 | Coffer ............................ 423/35 |
| 2006/0024224 | A1 | * | 2/2006 | Neudorf et al. ............... 423/138 |

* cited by examiner

*Primary Examiner* — George Wyszomierski
*Assistant Examiner* — Tima M McGuthry Banks
(74) *Attorney, Agent, or Firm* — Ralph H. Dougherty

(57) ABSTRACT

An improved method for processing of nickel-bearing ores, laterite ores, saprolite and limonite ores, oxidic and sulfide ores, metallurgical wastes, and other metal-bearing materials, to recover the valuable minerals contained therein, comprising comminuting ore to a desired size; leaching the ore at about 70 C to 130 C for about 30 minutes to 4 hours with nitric acid, raising the temperature of the solution to form a liquid/solid residue in which nickel, cobalt and magnesium values are in solution, and iron, manganese, and aluminum are solid residues in oxide form; conducting a liquid-solid separation and removing the solids; and recovering the nickel, cobalt, and manganese from the liquid-metal concentrate. The leachate is recovered and the nitric acid from the leachate is recycled.

19 Claims, 3 Drawing Sheets

NICKEL-LATERITE PROCESS

CROSS REFERENCE TO RELATED APPLICATION

This application claims the benefit of priority of PCT Application PCT/US2008/005608, filed May 1, 2008, and U.S. Provisional Patent Application Ser. No. 60/927,195, filed May 2, 2007.

FIELD OF THE INVENTION

The present invention relates to a method for processing of nickel-bearing ores, such as nickel laterites, particularly recovering of nickel and other metals, and more particularly to methods for recovery of iron, nickel, cobalt, magnesium, aluminum, chromium, and other valuable constituents of lateritic ores and other metal-bearing ores and materials.

BACKGROUND OF THE INVENTION

The compositions of ores vary tremendously, even taken from the same mining site. Laterite ores usually contain iron, nickel, cobalt, magnesium, manganese, chromium, and/or aluminum. Known processes for treating laterite ores are capable of handling only high magnesium saprolite ores or high-iron limonite type ores, whereas the present invention can process a full range of ores, including transitional ores. The term "ores" as used herein means oxide and sulfide ores, metallurgical wastes, and metal-bearing materials, it being understood that metals can be combined with other elements.

SUMMARY OF THE INVENTION

The invention is a method for processing of nickel-bearing ores to recover the valuable minerals contained therein. The process acts on any oxide or sulfide ores, metallurgical wastes, and metal-bearing materials, it being understood that in such materials, metals can be combined with other elements. The process is especially effective on ores which contain laterites. The ores may be ground or comminuted, if desired, or may be blended with other metal-bearing materials. The ores are normally leached at a temperature in the range of about 105 C to about 115 C for about 1½ to 3 hours with nitric acid, then the temperature of the solution is raised to about 165 C to form a liquid/solid residue in which the nickel, cobalt and magnesium are in solution, and the iron, some manganese, and some aluminum are solid residues in oxide form; followed by conducting a liquid-solid separation and removing the solids.

Optionally the liquid residue may be recycled to the leaching step from one to 8 times to increase the concentration of nickel, cobalt, and manganese in the liquid-metal concentrate. Advantageously, the nitric acid for the leach is provided by the process described in U.S. Pat. No. 6,264,909, entitled Nitric Acid Production and Recycle, which issued on Jul. 24, 2001, and which is incorporated herein by reference. It has been determined that neither hydrochloric acid nor sulfuric acid can be utilized in the invented process.

The present invention is particularly useful for recovery of nickel, cobalt, aluminum, iron, chromium, manganese, and magnesium. It can also be adapted to recover and produce nitrate salts, such as ammonium, sodium, potassium, calcium or magnesium nitrates.

OBJECTS OF THE INVENTION

The principal object of the present invention is to provide an improved method of recovering nickel and cobalt from lateritic ores.

Another object of this invention is to provide a method of recovering iron by precipitation as hematite.

Another object of this invention is to provide a method of recovering metal values from ores, metallurgical wastes, and other metal-bearing materials.

Another object of this invention is to provide a method of producing nitrate salts, such as ammonium, sodium, potassium, calcium, or magnesium nitrates.

It is a further object of this invention to produce materials useful as fertilizers.

It is also an object of this invention to produce materials useful as explosives.

It is also an object of this invention to provide a process that works effectively on lateritic ores, and equally well on saprolite and limonite ores, oxide and sulfide ores, metallurgical wastes, and other metal bearing materials.

BRIEF DESCRIPTION OF THE DRAWINGS

The foregoing and other objects will become more readily apparent by referring to the following detailed description and the appended drawings in which.

DETAILED DESCRIPTION

Figure 1:
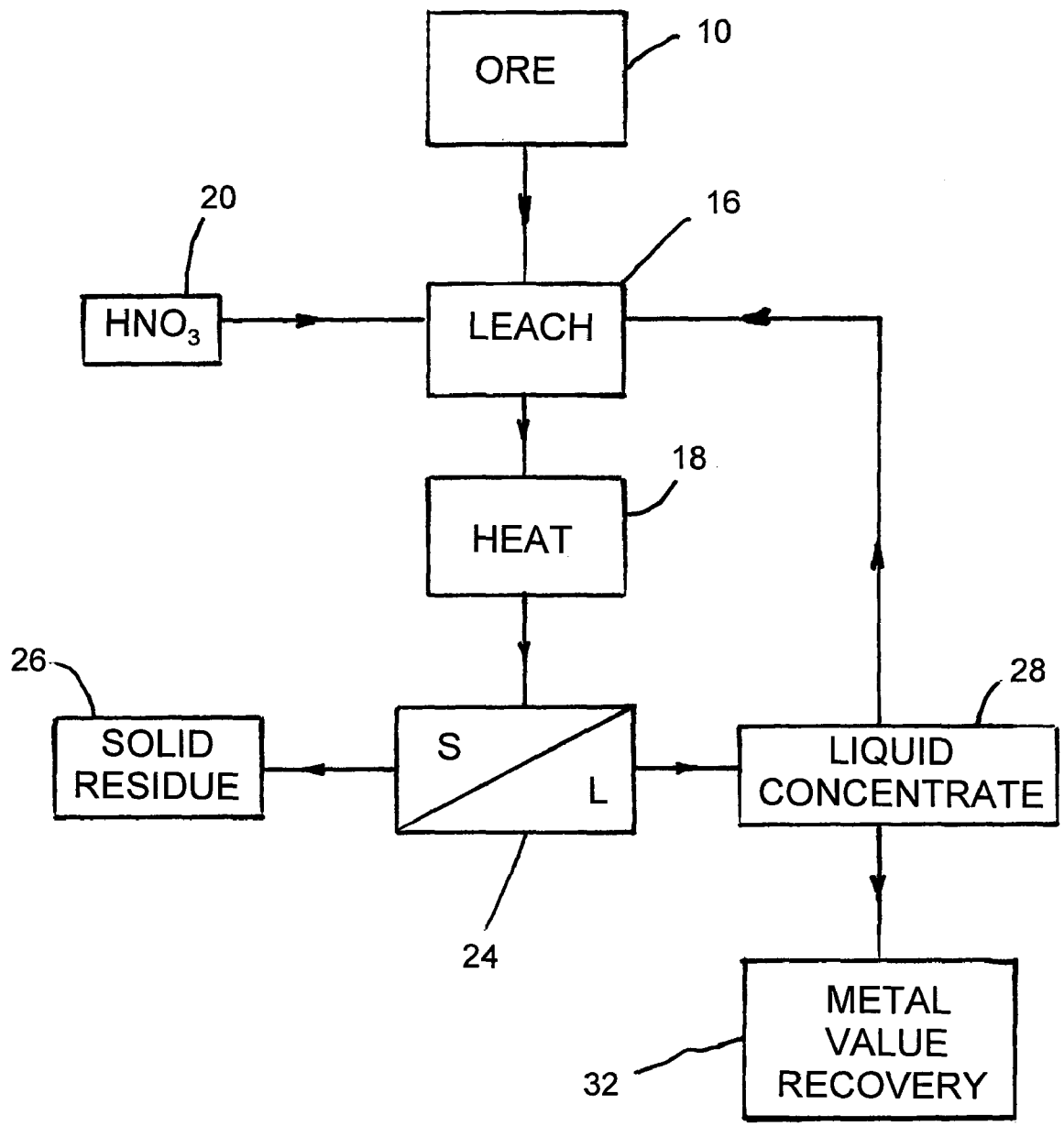
FIG. 1 is a schematic flowsheet of the invented process in its most basic form.

Referring now to the drawings, FIG. 1 shows the invented process in its basic form. The process starts with run of the mine lateritic ores 10 or other metal bearing materials. The ore is leached 18 at a temperature of less than 160 C, generally from about 70 C to 130 C, but preferably about 105 C to 115 C, for about 30 minutes to about 4 hours, preferably about 100 to about 200 minutes, with nitric acid 20. The acid can be a 10 to 90% (weight percent) nitric acid solution, but preferably is about 30 to 67% nitric acid, and optimally is about a 45 to 55% acid solution.

The nitric acid for the leaching process is preferably obtained from a nitric acid recycle process in accordance with U.S. Pat. No. 6,264,909, referred to above.

The temperature of the leach solution is raised by heating 22 to a temperature of about 125 to 200 C, preferably to about 165 C, to form a liquid/solid residue in which the nickel, cobalt and magnesium are in solution, and the iron, manganese, and aluminum are solid residues in oxide form. The heating is carried out in an enclosure from which the evolved gases (principally $NO_x$) are recovered for further treatment. The leaching and heating steps can be carried out in the same vessel, or in separate vessels.

A liquid-solid separation 24 produces a solid residue of iron, manganese and aluminum oxides and a liquid-metal concentrate 28 containing nickel, cobalt, and manganese values, which are then recovered.

Figure 2:
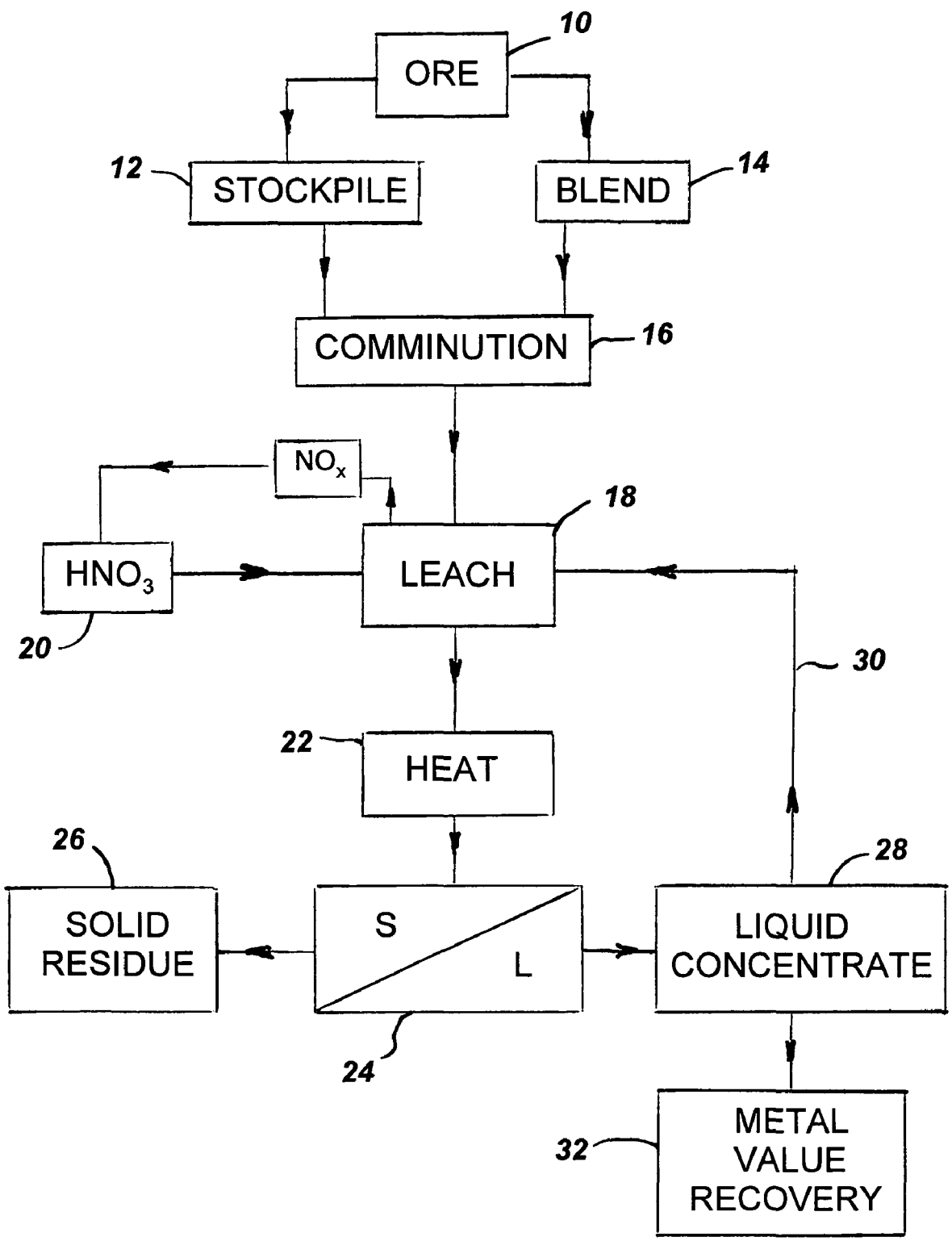
FIG. 2 is a schematic flowsheet showing an alternative method of operating the process.

As shown in FIG. 2, ores 10 may be stockpiled 12 for processing, or they may be blended 14 with other ores, metallurgical wastes, or other metal-bearing materials.

When required, the ores are comminuted 16, ground, or reduced in size to whatever desired size is determined by the operator to be effective or necessary to aid in the dissolution of the ore in the leaching acid.

The ore is then fed to the leach step 18 where leaching with nitric acid from source 20 is carried out. The leach solution is then heated at 22, and fed to a solid-liquid separation 24.

The liquid-metal concentrate 28 is treated 32 to recover the nickel and cobalt values, or the liquid-metal concentrate may be recycled 30 for use in the leaching step 18, if desired. The concentrate can be recycled one or more times to increase the concentration of nickel, cobalt, and manganese metal values in the liquid leachate, which will improve the recovery of these metal values.

The iron can be precipitated from the leach solution by thermal hydrolysis, as shown, or by shifting the pH of the solution, or by solvent extraction.

The aluminum is removed from the leach solution leaving the nickel and cobalt values.

Shifting of the pH of the solution is accomplished by adding or removing nitric acid, or by adding alkaline earths such as oxides, hydroxides or carbonates of calcium, magnesium, strontium, or barium, or other source of alkalinity such as ammonia ($NH_3$) ammonium hydroxide ($NH_4OH$) ammonium carbonate ($(NH_4)_2CO_3$) or ammonium bicarbonate ($NH_4HCO_3$) to the solution.

Precipitation of iron is usually accomplished at a pH of 2 to 3;

Precipitation of alumina is usually accomplished at a pH of 4-5;

Precipitation of nickel is usually accomplished at a pH of 6-7;

Precipitation of manganese is usually accomplished at a pH of 8-9;

Precipitation of MgO is usually accomplished at a pH of 10-11;

Precipitation of Ca is usually accomplished at a pH of 12-13.

The solid residue 26 is removed for the recovery of the iron, manganese, and aluminum by any desired process.

In its optimum form, the invented process, which ordinarily operates at atmospheric pressure, consists of comminuting ore to a desired particle size, leaching the ore at about 105 to 115 C for about 2 hours with about 45% nitric acid, raising the temperature of the leach solution to about 165 C to form a liquid/solid residue in which the nickel, cobalt and magnesium are in solution, and the iron, manganese, and aluminum are solid residues in oxide form; conducting a liquid-solid separation and removing the solids; recycling the liquid residue from one to 8 times to increase the concentration of nickel, cobalt, and magnesium in the liquid-metal concentrate; and recovering the nickel and cobalt values.

Once the nickel and cobalt are in solution, which usually is to a degree in excess of 98%, and the iron has already been removed, then the cobalt and nickel are easily recovered by thermal hydrolysis, pH shift, solvent extraction, or by sulfide precipitation.

Figure 3:
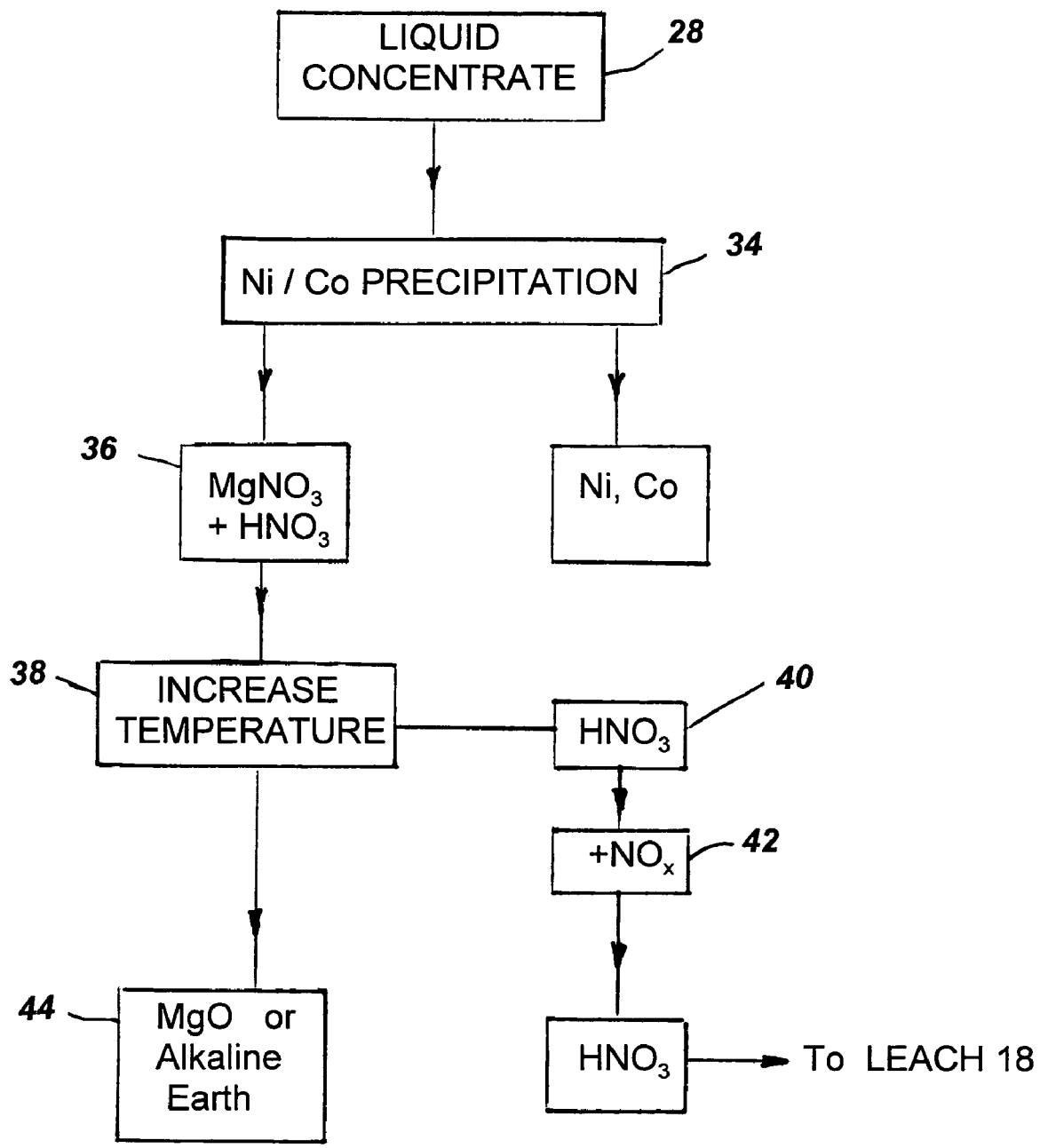
FIG. 3 is a schematic flowsheet for recovery of nickel, cobalt, and other constituents from the liquid-metal concentrate.

After nickel-cobalt precipitation at 34, magnesium nitrate 36 is removed along with nitric acid. The magnesium nitrate is then thermally decomposed at 38, as shown in FIG. 3, by raising the temperature of the solution to at least 450 C to form MgO and gaseous nitric oxides, including gasified $HNO_3$. Alternatively, it may be precipitated by reaction with alkaline earth oxides or hydroxides, or by heating. Precipitation with lime ($CaCO_3$) produces $Ca(NO_3)_2$ which is a salable by-product used in fertilizers. The temperature may be raised to about 550 C to decompose calcium nitrate and recover the nitric acid. The nitric values 40 are removed, leaving the magnesium oxide or other alkaline earth 44. The removed nitric acid 40, with $NO_x$ 42 added, as necessary, is recycled to the leaching step 18, or to the nitric acid recycle process for further use.

Each of the foregoing metal values precipitates at a progressively higher temperature, beginning with iron at about 165 C to Mg at about 450 C.

In any place throughout the process where nitric acid or oxide is removed, it may be recycled to the nitric acid recycle process for further use.

ALTERNATIVE EMBODIMENTS

Alternatively, the invented process may be operated to produce nitrates and other value added chemicals, such as ammonium nitrate ($NH_4NO_3$), calcium nitrate, magnesium nitrate, sodium and potassium nitrates, etc., which are extensively used in fertilizers and explosives.

An example is the use of hydrated lime ($Ca(OH)_2$) to precipitate high grade magnesium hydroxide $Mg(OH)_2$ from magnesium nitrate solution, for sale or for internal consumption. The resulting calcium nitrate can be sold or converted to valuable precipitated calcium carbonate $CaCO_3$ for use in paper or paint manufacture by adding ammonium carbonate to the calcium nitrate solution, resulting in precipitated $CaCO_3$ and a concentrated solution of ammonium nitrate. This greatly increases and diversifies revenue while reducing the need for nitric acid recycle.

SUMMARY OF THE ACHIEVEMENT OF THE OBJECTS OF THE INVENTION

From the foregoing, it is readily apparent that I have invented an improved method for processing of nickel laterite ores to recover the valuable minerals contained therein, including nickel, cobalt, and magnesium, as well as recovering other metal values from nickel-laterite ores, oxide and sulfide ores, metallurgical wastes, and other metal-bearing materials, faster and more economically than heretofore has been possible.

It is to be understood that the foregoing description and specific embodiments are merely illustrative of the best mode of the invention and the principles thereof and that various modifications and additions may be made to the apparatus by those skilled in the art, without departing from the spirit and scope of this invention, which is therefore understood to be limited only by the scope of the appended claims.

What is claimed is:

1. A method of recovering metal values from nickel-bearing ores, metallurgical wastes, and metal-bearing materials, consisting of the following steps:

leaching the ores, wastes, or other metal-bearing materials with a 10 to 90% by weight nitric acid solution to form a leachate solution;

heating the leachate solution to a temperature in the range of about 125 to 200 C to form a liquid/solid residue;

separating solid residue from the leachate to form a metal-bearing solution; and recovering metal values from the metal-bearing solution.

2. A method according to claim 1, further comprising precipitating iron from the solution by thermal hydrolysis, or by shifting the pH of the solution.

3. A method according to claim 2, wherein the shifting of the pH of the leach solution is accomplished by adding alkaline materials to the solution.

4. A method according to claim 3, wherein the alkaline materials are selected from the group consisting of oxides, hydroxides or carbonates of calcium, magnesium, strontium, or barium, or ammonia ($NH_3$) ammonium hydroxide ($NH_4OH$) ammonium carbonate (($NH_4)_2CO_3$) or ammonium bicarbonate ($NH_4HCO_3$).

5. A method according to claim 1, wherein the leaching step is performed for a period of 30 to 240 minutes.

6. A method according to claim 1, wherein the nickel-bearing ores are laterites.

7. A method according to claim 1, wherein the leaching step is performed for a period of from 100 to 200 minutes.

8. A method according to claim 1 wherein the nitric acid in the leaching step is a 30 to 67% by weight nitric acid solution.

9. A method according to claim 1 wherein the leaching step is performed at a temperature of from 70 to 130 C.

10. A method according to claim 1 wherein the heating step comprises raising the temperature of the leach solution to about 165 C to form a liquid/solid residue.

11. A method according to claim 1 further comprising returning all or part of the metal-bearing solution to the leaching step at least once to increase the concentration of metal values in the metal-bearing solution.

12. A method according to claim 1, further comprising:
recovering nickel/cobalt from the metal-bearing solution by thermal hydrolysis, pH shift, sulfide precipitation, or solvent extraction to form $Ni(OH)_2$/NiO, $Co(OH)_2$/CoO, Ni/Co salts, and magnesium nitrate; and
thermally decomposing the magnesium nitrate by raising the temperature of the solution to at least 450 C to form MgO and gaseous nitric oxides and acid.

13. A method according to claim 12, further comprising separating nitric values from the MgO, and recycling the nitric acid to the leaching step.

14. A method of recovering metal values from nickel-bearing ores, metallurgical wastes, and metal-bearing materials, comprising the steps of:
leaching the ores, wastes, or other metal-bearing materials with a 10 to 90% by weight nitric acid solution to form a leachate solution;
heating the leachate solution to a temperature in the range of about 125 to 200 C to form a liquid/solid residue;
separating solid residue from the leachate to form a metal-bearing solution;
recovering nickel/cobalt from the metal-bearing solution by thermal hydrolysis, pH shift, sulfide precipitation, or solvent extraction to form $Ni(OH)_2$/NiO, $Co(OH)_2$/CoO, Ni/Co salts, and magnesium nitrate solution; and
adding lime to the magnesium nitrate solution to precipitate $Mg(OH)_2$ (magnesium hydroxide) therefrom and forming calcium nitrate.

15. A method according to claim 14, further comprising:
precipitating calcium carbonate ($CaCO_3$) for use in paper or paint manufacture by adding ammonium carbonate to the calcium nitrate solution, resulting in precipitated $CaCO_3$ and a concentrated solution of ammonium nitrate.

16. A method of recovering metal values from ores, comprising the steps of:
leaching the ores with nitric acid to extract the desired metal values;
separating solid residue from the leachate to form a metal-bearing solution;
precipitating iron from the solution by thermal hydrolysis, solvent extraction, or pH shift;
recovering nickel/cobalt from the solution by pH shift, or hydrolysis, or sulfide precipitation, or solvent extraction; and
raising the temperature of the solution to at least 450 C to decompose magnesium nitrate and form MgO, gaseous nitric oxides, and nitric acid.

17. A method according to claim 16 wherein shifting of pH is accomplished by alkaline or alkaline earth additions to the solution.

18. A method according to claim 17 wherein the alkaline earth additions are selected from the group comprising MgO, $Mg(OH)_2$, and $MgCO_3$.

19. A method according to claim 16 wherein the ores are nickel-laterites.

\* \* \* \* \*